(12) United States Patent
Heidemann et al.

(10) Patent No.: US 7,441,979 B2
(45) Date of Patent: Oct. 28, 2008

(54) BALL AND SOCKET JOINT, FOR USE IN VEHICLES

(75) Inventors: Manfred Heidemann, Belm-Vehrte (DE); Helmut Noe, Hörstel (DE); Anja Wehrsse, Radderstorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/597,057

(22) PCT Filed: Jan. 5, 2005

(86) PCT No.: PCT/DE2005/000004

§ 371 (c)(1), (2), (4) Date: Dec. 11, 2006

(87) PCT Pub. No.: WO2005/066509

PCT Pub. Date: Jul. 21, 2005

(65) Prior Publication Data

US 2007/0092329 A1     Apr. 26, 2007

(30) Foreign Application Priority Data

Jan. 8, 2004   (DE) .................. 10 2004 001 465

(51) Int. Cl.
*F16C 11/06*   (2006.01)
(52) U.S. Cl. ............... 403/134; 403/50; 403/51
(58) Field of Classification Search ............ 403/50, 403/51, 122, 134; 277/635
See application file for complete search history.

(56) References Cited

U.S. PATENT DOCUMENTS 2,921,809 A * 1/1960 Kogstrom ............ 403/134
6,357,956 B1    3/2002 Zebolsky et al.
6,814,521 B2 * 11/2004 Suzuki et al. ............ 403/134
7,070,355 B2 *  7/2006 Abels et al. .............. 403/50

FOREIGN PATENT DOCUMENTS

| DE | 37 05 847  |   | 9/1988 |
|----|------------|---|--------|
| DE | 102 50 147 |   | 5/2003 |
| DE | 103 00 678 |   | 9/2003 |
| JP | 402199317  | * | 8/1990 |
| JP | 11063245   |   | 3/1999 |

* cited by examiner

*Primary Examiner*—Michael P Ferguson
(74) *Attorney, Agent, or Firm*—McGlew & Tuttle, P.C.

(57) ABSTRACT

A ball and socket joint is provided, preferably for use in vehicles, especially in the area of the chassis of motor vehicles. The ball and socket joint includes a ball and socket joint housing having a joint opening, with a ball pivot, which is arranged in the ball and socket joint housing, extends through the joint opening and with which a shaft is made integral. A support ring is arranged on the shaft of the ball pivot. A sealing element is arranged between the support ring and a connection component surrounding the shaft of the ball pivot. The function of the sealing element is preserved over comparatively long periods of time without being adversely affected by corrosion phenomena in the area of the ball pivot.

The sealing element is designed for this purpose as an elastically and/or plastically deformable profiled body (15), whose effective cross section, which is free from the effect of forces, is limited by a continuously extending, curved contour (19), which is subject to deformation in the installed state, as a result of which at least a partial area of the contour (19) is in contact with the adjoining areas (10, 13, 14) that are to be sealed.

23 Claims, 5 Drawing Sheets

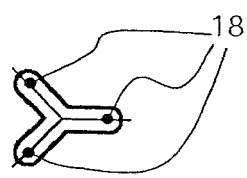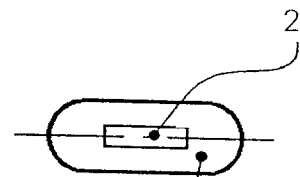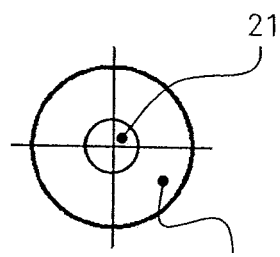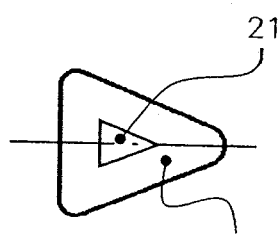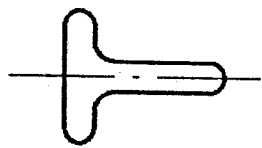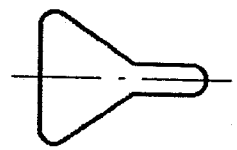
Fig. 5

BALL AND SOCKET JOINT, FOR USE IN VEHICLES

CROSS REFERENCE TO RELATED APPLICATIONS

This application is a United States National Phase application of International Application PCT/DE 2005/000004 and claims the benefit of priority under 35 U.S.C. § 119 of German Patent Application DE 10 2004 001 465.5 filed Jan. 8, 2004, the entire contents of which are incorporated herein by reference.

FIELD OF THE INVENTION

The present invention pertains to a ball and socket joint, preferably for use in vehicles, especially in the area of the chassis of motor vehicles, with a ball and socket joint housing having a joint opening, with a ball pivot, which is arranged in the ball and socket joint housing, extends through the joint opening and with which a shaft is made integral, with a support ring arranged on the shaft of the ball pivot and with a sealing element, which is arranged between the support ring and a connection component surrounding the shaft of the ball pivot.

BACKGROUND OF THE INVENTION

It is usually necessary in ball and socket joints to guarantee the relative motion of the joint parts in relation to one another without limitations of the function at least over a service life preset for the type of ball and socket joint in question. There must be sufficient sealing against external effects, especially against the penetration of foreign bodies and moisture. Support rings, which are arranged on the ball pivot of the ball and socket joint and on which the pivot-side sealing labyrinth of a sealing bellows can be sealingly fixed, are used for this purpose.

A ball and socket joint for motor vehicles, which has a gasket made of an elastically deformable material between the housing of the ball and socket joint and a ball pivot carrying the joint ball, is known in this connection from DE-OS 37 05 847. A support ring, which is arranged adheringly on the ball pivot and meshes with the bearing surface of the gasket in a positive-locking manner, is inserted between the bearing surface of the gasket and the ball pivot.

Sealing is brought about in this solution in the area of the support ring by the support ring being provided with a coating consisting of an elastic material.

Furthermore, a ball and socket joint, which comprises essentially a ball pivot and a ball socket for holding the head of the ball pivot with a bearing inserted in between, is known from DE 103 00 678 A1. Furthermore, the ball and socket joint has a retaining ring, which comprises a cylindrical part, which is arranged on an outer circumferential surface of the shaft of the ball pivot, and a flange, which projects from one end of the cylindrical part of the retaining ring and comes into close contact with a fastening bead of a sleeve.

In connection with this teaching, the area in which the retaining ring is arranged on the shaft of the ball pivot is filled with a sealant, which penetrates as a liquid into recesses in this area.

SUMMARY OF THE INVENTION

The basic object of the present invention is to perfect a ball and socket joint such that its ability to function is preserved over comparatively long periods of time regardless of the specific design of the joint, without being adversely affected by corrosion phenomena in the area of the ball pivot.

The object is accomplished according to the present invention on a ball and socket joint of the type described by the sealing element used to seal the shaft of the ball pivot being designed as an elastically and/or plastically deformable profiled body, whose effective cross section, which is free from the effect of forces, is limited by a continuously extending, curved contour, which is subject to deformation in the installed state, as a result of which a partial area of the contour is in contact with the adjacent areas that are to be sealed.

The present invention is associated with the advantage that based on the given elastic and/or plastic deformability of the profiled body, the material properties and the geometric shape of the profiled body, such as the contour of the cross section, can be selected in a specific manner such that the required sealing action is achieved depending on the installation position and the pretension exerted on the profiled body.

To embody a selective sealing function of the sealing element designed as a profiled body, the elastically and/or plastically deformable profiled body has a profiled basic body and sealing segments in the embodiment of the present invention. The sealing segment in question can thus be specially adapted to the sealing function to be ensured in the particular case, among other things, by selecting the manner of its arrangement and its connection with the profiled basic body. At least some of the sealing segments preferably extend here essentially in the radial direction relative to the profiled basic body.

To control the deflection behavior of the sealing segment in a use-dependent manner, optionally for achieving a corresponding response behavior for a certain number of sealing segments, transition areas, which are shaped and whose material is selected such that elastic and pretension-related deflection of the sealing segment adjoining the particular transition area is ensured, may be provided for connecting the profiled basic body with the sealing segments.

In a preferred embodiment of the present invention, the profiled body has a connection surface, via which the profiled body is connected to an adjoining component.

The adjoining component is preferably a support ring, which is to be arranged on the ball pivot of the ball and socket joint. The connection between the profiled body and the support ring may be established by vulcanization or by bonding.

It is also possible to position the profiled body on the shaft of the ball pivot or the support ring in preparation for the mounting of the ball and socket joint. The profiled body may be expediently positioned as a result of a radial expansion of the profiled body by positive locking and/or non-positive locking on the component in question.

In another preferred embodiment of the present invention, the support ring has a radially extending flange, with which at least one sealing segment of the profiled body is in contact under pretension. In addition as well as an alternative hereto, at least one sealing segment of the profiled body may be in contact with the radially outer front surface of the flange of the support ring under pretension, so that a redundant sealing system can be created on this basis.

To create defined elasticity and sealing conditions, the profiled body may have stabilizing elements, which may be designed as a strip or round bars and are used to stabilize the core structure of the transition areas to the sealing segments and the sealing segments themselves.

The present invention shall be explained in more detail below on the basis of exemplary embodiments and corresponding drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5A is a side sectional view of another, non-pretensioned profiled bodies;

FIG. 5B is a side sectional view of another, non-pretensioned profiled bodies;

FIG. 5C is a side sectional view of another, non-pretensioned profiled bodies;

FIG. 5D is a side sectional view of another, non-pretensioned profiled bodies;

FIG. 5E is a side sectional view of another, non-pretensioned profiled bodies; and FIG. 5F is a side sectional view of another, non-pretensioned profiled bodies;

DESCRIPTION OF THE PREFERRED EMBODIMENTS

Figure 1:
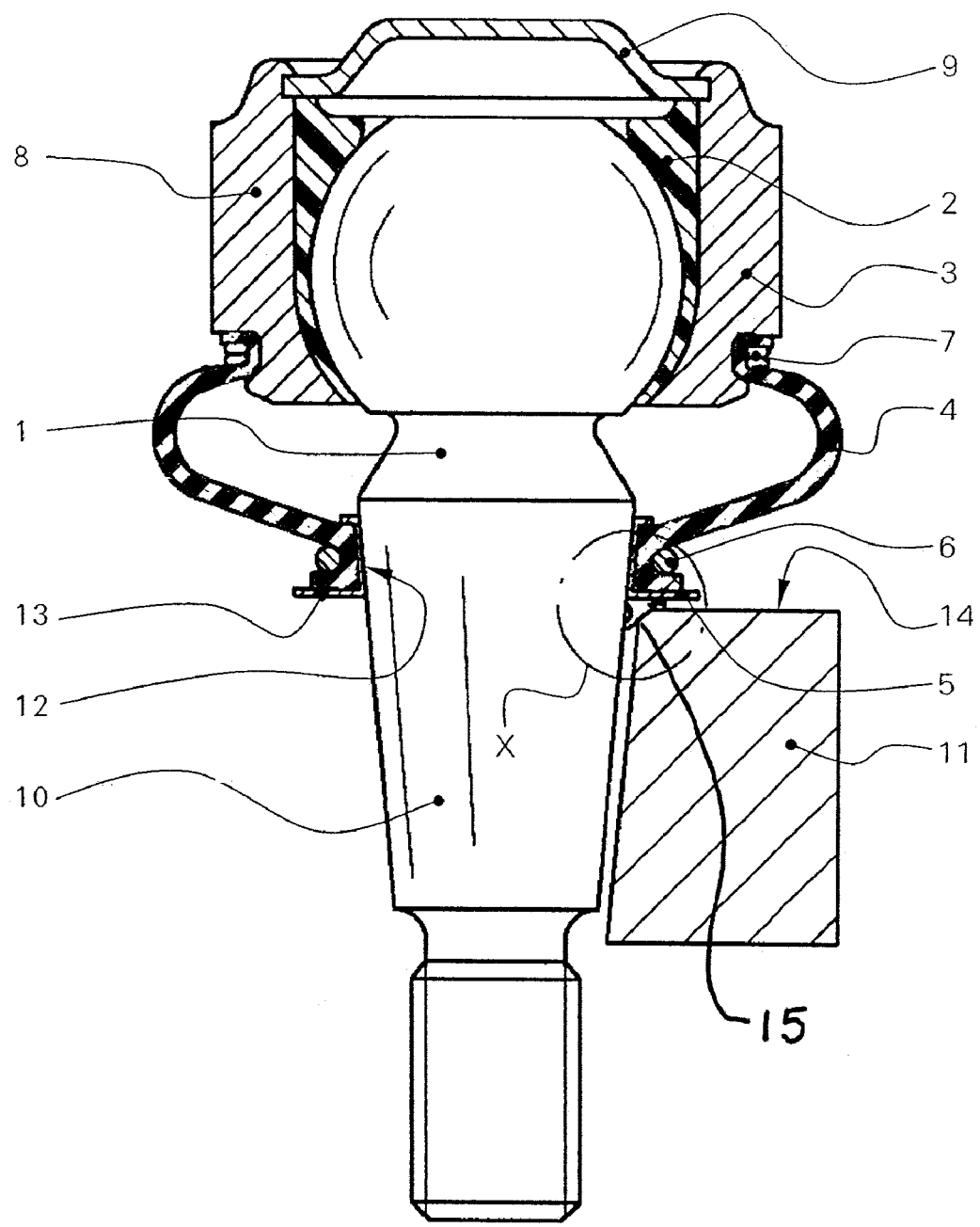
FIG. 1 is a synoptic view of a hinge joint designed as a ball and socket joint with a profiled body according to the present invention.

Referring to the drawings in particular, the hinge joint shown schematically in FIG. 1 is a ball and socket joint with some features known per se to the person skilled in the art. The presentation of the design of the ball and socket joint can therefore be limited to the most important elements.

The ball and socket joint comprises essentially a ball pivot 1, a bearing shell 2 and a housing 3, which surrounds the ball pivot 1 and the bearing shell 2 at least partially. The ball and socket joint is sealed in the transition area from the housing 3 to the ball pivot 1 by a sealing bellows 4, which is held in the sealing position by means of the support ring 5, the round straining ring 6 and the flat straining ring 7 and makes possible a change in the relative position of the ball pivot 1 in relation to the housing 3.

The housing 3 is, itself, of a two-part design and comprises a housing basic body 8 and a closing cover 9, which closes the housing 3 on the side facing away from the ball pivot 1 after the insertion of the ball pivot 1 into the housing basic body 8.

The ball pivot 1 has a conically extending shaft 10, which is connected to a connection component 11 in a positive-locking and non-positive manner. The conically extending shaft 10 carries the support ring 5, which is in turn formed from a basic web 12 that is in contact with the shaft 10 of the ball pivot 1 and a flange 13 extending at an angle to the basic web 12.

The flange 13 of the support ring 5 and a reference surface 14 of the connection component 11 are separated at least partially by a pretensioned sealing element, which is designed as a profiled body 15. Since the sealing action of the profiled body 15 develops at a radially spaced location from the circumferential surface of the shaft 10 of the ball pivot 1, effective protection of the ball pivot 1 against corrosion is achieved.

Figure 2:
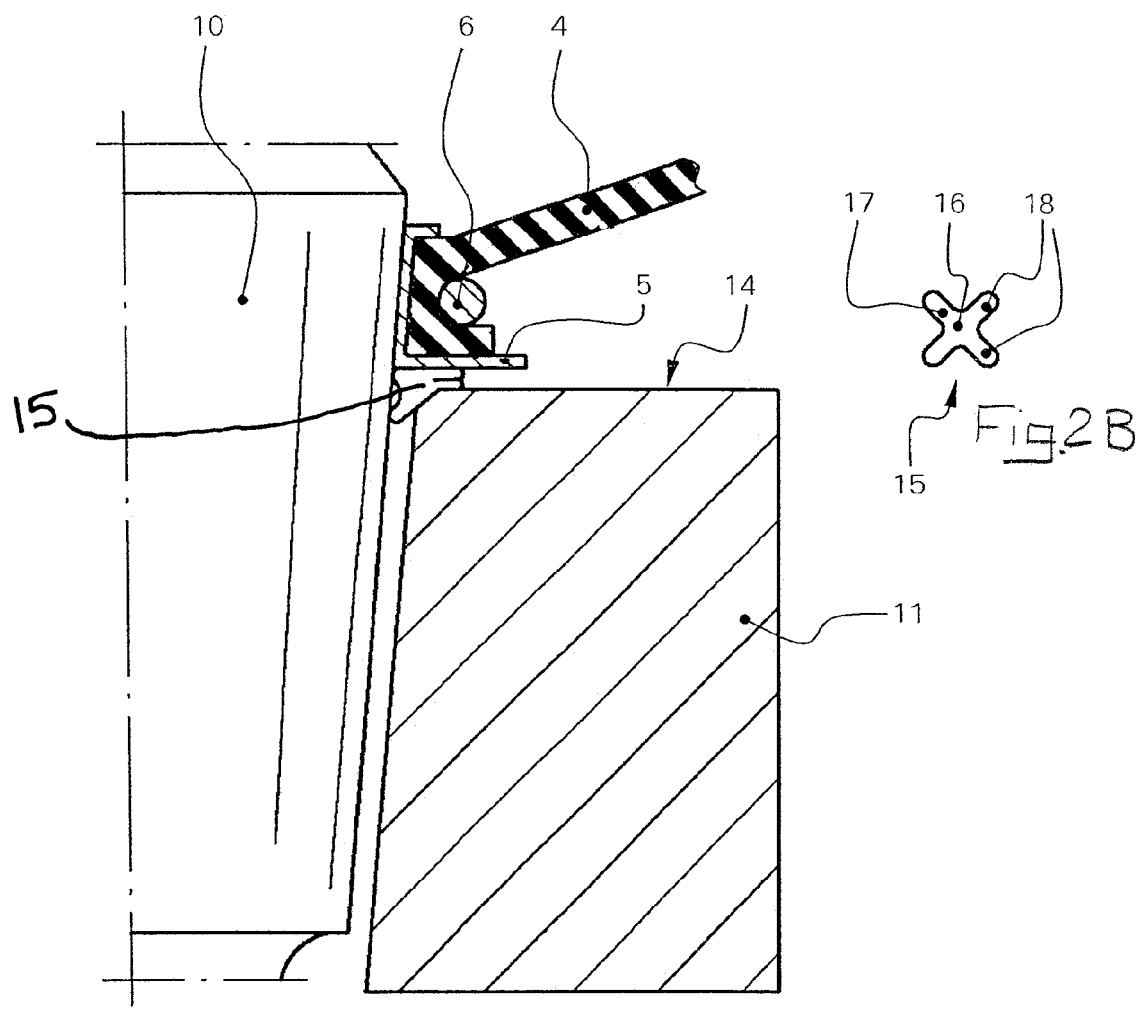
FIG. 2A is a sectional view of a detail X according to FIG. 1 with a profiled body, which is installed and is thus in the pretensioned state, the profiled body differing from the other profiled bodies of the other embodiments in terms of their cross-sectional contours.
FIG. 2B is a side view showing the profiled body of FIG. 2A in a tension-free state.
Figure 3:
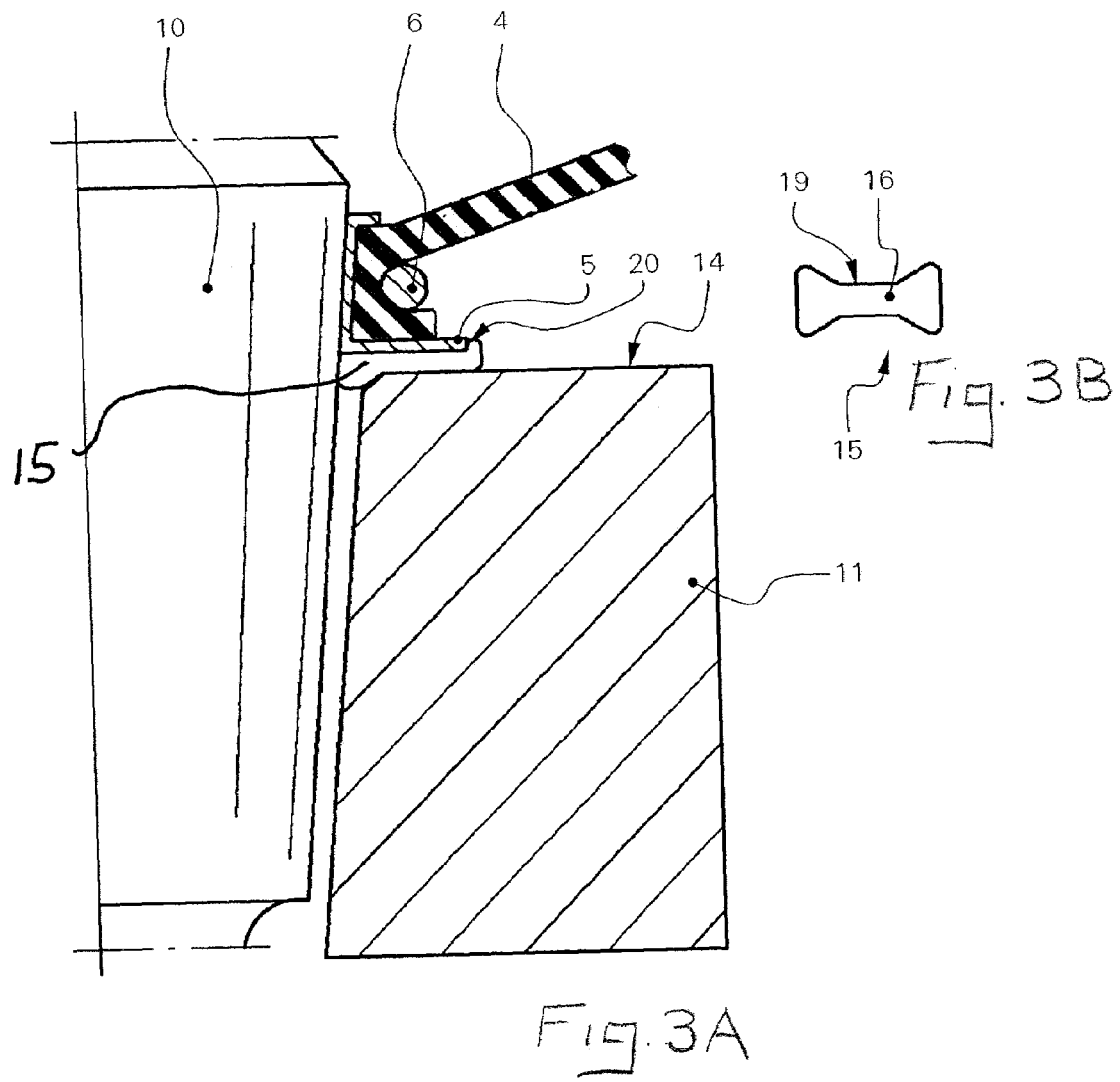
FIG. 3A is a sectional view of a detail X according to FIG. 1 with a profiled body, which is installed and is thus in the pretensioned state, the profiled body differing from the other profiled bodies of the other embodiments in terms of their cross-sectional contours.
FIG. 3B is a side view showing the profiled body of FIG. 3A in a tension-free State.
Figure 4:
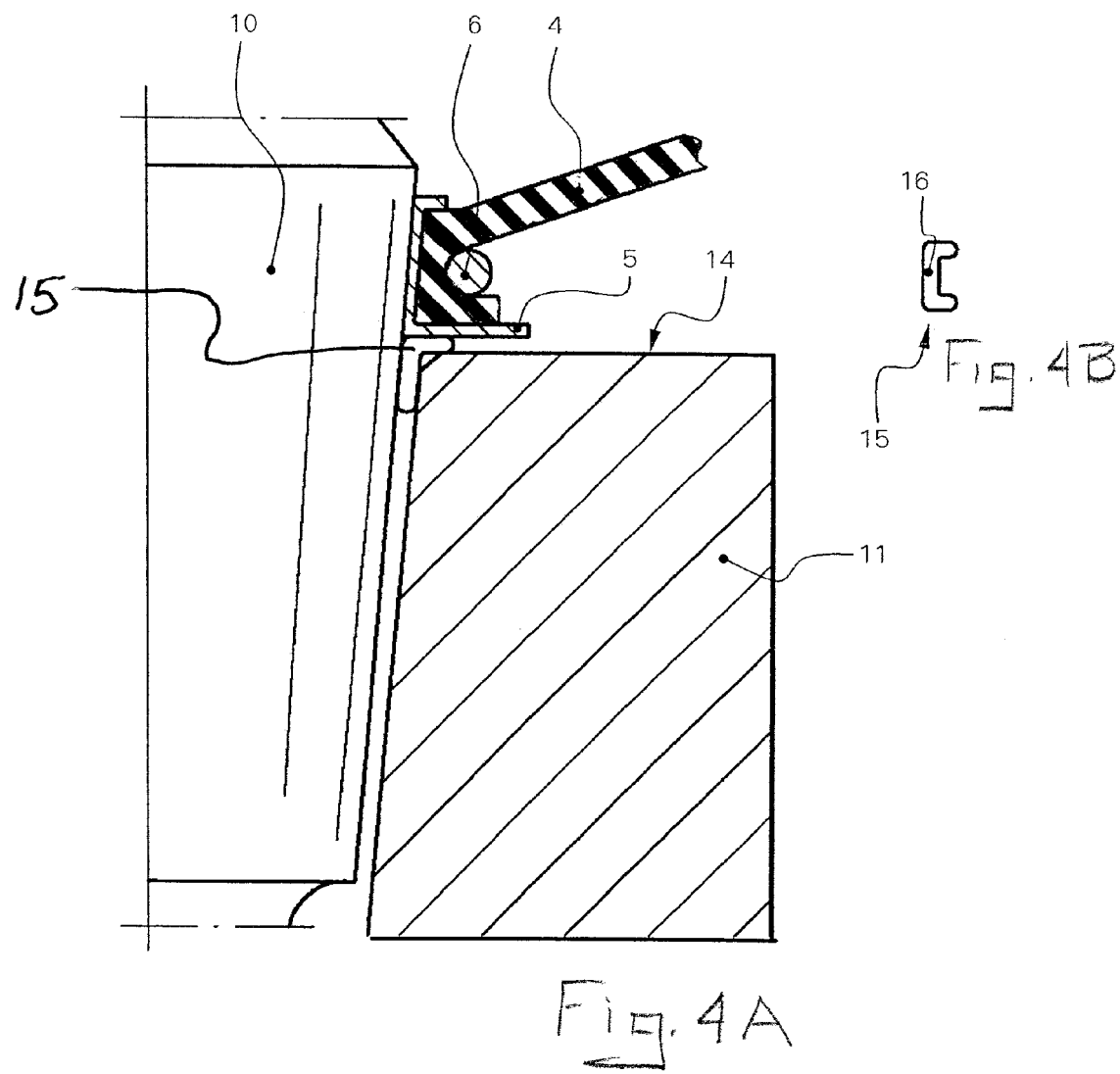
FIG. 4A is a sectional view of a detail X according to FIG. 1 with a profiled body, which is installed and is thus in the pretensioned state, the profiled body differing from the other profiled bodies of the other embodiments in terms of their cross-sectional contours.
FIG. 4B is a side view showing the profiled body of FIG. 4A in a tension-free state.

FIGS. 2 through 4 show different profiled bodies 15 in both the tension-free state and the pretensioned installed position in the ball and socket joint. They comprise a profiled basic body 16 each with transition areas 17, which are joined by sealing segments 18. The continuously extending contour 19 of the sealing cross section of the profiled body 15, which contour is relevant for the sealing action, is determined by the sealing segments 18. For example, an especially efficient sealing action is achieved in the case of the profiled body 15 shown in FIG. 2 by the two radially outer sealing segments 18 forming together a first barrier produced between the flange 13 of the support ring 5 and the reference surface 14 of the connection component 11 and by there being multiple redundancy due to the fact that a third and fourth sealing segment 18 are sealingly in contact with the shaft 10 of the ball pivot 1 under pretension.

Sealing of the shaft 10 of the ball pivot 1 is achieved in profiled bodies 15 provided with sealing segments 18 essentially by compression or bending of the sealing segment 18 in question, which takes place under the action of force, and, in the presence of transition areas, by a deflection of the sealing segments 18 as a consequence of the elastic properties of the transition areas 17.

The sealing segments 18 have large volumes in the profiled body 15 shown in FIG. 3, which has an elongated design, so that a sealing segment is brought two-dimensionally into contact with the shaft 10 of the ball pivot 1, on the one hand, and the sealing segment 18 located opposite this extends around the flange 13 of the support ring 5 and comes into contact with the front surface 20 of the flange 13, on the other hand.

Regardless of the embodiment selected, it is within the scope of the present invention to combine sealing segments 18 of different shapes on a profiled body 15 in order to achieve the desired sealing action at the particular sealing position of the sealing segment 18 and to create a redundant sealing system by the cooperation of the sealing segments 18.

The peculiarity of the profiled body 15 shown in FIG. 4 is especially that the transition areas 17 pass over into the profiled basic body 16 and into the sealing segments 18 with continuously extending radii of curvature, so that the sealing action of the entire profiled body 15 is also determined by the elastic properties of the profiled basic body 16.

FIG. 5 shows a selection of other preferred cross-sectional shapes of profiled bodies 15, which makes it possible to obtain an efficient sealing action. Shapes that contain sealing segments 18 and transition areas 17 to the profiled basic body 16 as desired as well as shapes in which sealing segments 18 may be omitted with respect to the application of the profiled body 15 have been selected. Depending on the concrete application and the desired sealing action, it is within the scope of the present invention to provide the profiled bodies 15 with stabilizing elements 21.

Based on the sealing elements presented within the framework of the present invention, which are designed as profiled bodies, it is possible to select the particular, suitable sealing element as a function of the site of installation of the ball and socket joint and the necessary sealing function.

While specific embodiments of the invention have been shown and described in detail to illustrate the application of the principles of the invention, it will be understood that the invention may be embodied otherwise without departing from such principles.

The invention claimed is:

1. A ball and socket joint comprising:
   a ball and socket joint housing having a joint opening;
   a ball pivot including a joint ball portion arranged in the ball and socket joint housing, said ball pivot extending through the joint opening and with which a shaft is made integral;
   a support ring arranged on the shaft of the ball pivot;
   a sealing bellows extending from said ball and socket joint housing to said support ring, wherein one end of said sealing bellows engages said support ring;
   a connection component surrounding said shaft, said connection component comprising a through bore receiving said shaft of said ball pivot; and
   an annular sealing element, which is arranged between the support ring and said connection wherein said sealing element comprises an elastically and/or plastically deformable profiled body having an effective cross section, which is free from the effect of forces, that is limited by a continuously extending, curved contour, which is subject to deformation in an installed state, as a result of which at least a partial area of said contour is in contact with adjoining areas that are to be sealed, wherein one portion of said sealing element extends generally axially and is radially arranged within said through bore, between said shaft of said ball pivot and said connection component in a radial direction of said ball pivot, and another portion of said sealing element extends radially and is axially arranged on a side of said support ring opposite said sealing bellows between said support ring and said connection component in an axial direction of said ball pivot, said connection component being located at a first axial distance from said joint ball portion, said support ring being located at a second axial distance from said joint ball portion, said first axial distance being greater than said second axial distance.

2. A ball and socket joint in accordance with claim 1, wherein said elastically and/or plastically deformable profiled body has a profiled basic body and sealing segments.

3. A ball and socket joint in accordance with claim 2, wherein said sealing segments extend radially oriented in relation to said profiled basic body.

4. A ball and socket joint in accordance with claim 2, wherein transition areas are provided for connecting said profiled basic body to said sealing segments.

5. A ball and socket joint in accordance with claim 4, wherein a material or a material combination that permits elastic deflection of said sealing segments adjoining said transition area is selected for said transition area.

6. A ball and socket joint in accordance with claim 2, wherein said support ring has a radially extending flange, with which at least one said sealing segment of said profiled body is in contact under pretension.

7. A ball and socket joint in accordance with claim 2, wherein said support ring has a radially extending flange, with a radially outer front surface of which at least one said sealing segment of said profiled body is in contact under pretension.

8. A ball and socket joint in accordance with claim 1, wherein said profiled body has a connection surface, via which said profiled body is connected to an adjoining component.

9. A ball and socket joint in accordance with claim 8, wherein said adjoining component is said support ring.

10. A ball and socket joint in accordance with claim 8, wherein the connection between said profiled body and said adjoining component is established by vulcanization or bonding.

11. A ball and socket joint in accordance with claim 8, wherein said profiled body is positioned on said ball pivot or said support ring in preparation for the mounting of said ball and socket joint.

12. A ball and socket joint in accordance with claim 11, wherein said profiled body is positioned on said adjoining component as a result of a radial expansion of said profiled body such that said profiled body forms a positive-locking connection or non-positive connection with said adjoining component.

13. A ball and socket joint in accordance with claim 1, wherein said profiled body has at least one stabilizing element.

14. A ball and socket joint in accordance with claim 1, wherein said sealing element maintains said shaft of said ball pivot at a radially spaced location from said connection component, said sealing element maintaining said support ring at said axially spaced location from said connection component.

15. A ball and socket joint in accordance with claim 1, wherein said support ring has a radial flange and an axial support ring portion, said sealing bellows engaging said axial support ring portion and said radial flange, said radial flange extending between said sealing bellows and said sealing element.

16. A ball and socket joint in accordance with claim 1, wherein said support ring directly engages said shaft.

17. A motor vehicles chassis ball and socket joint comprising:
   a ball and socket joint housing having a joint opening;
   a ball pivot comprising a ball portion arranged in said ball and socket joint housing and an integral shaft portion arranged outside of said ball and socket joint housing;
   a support ring on said shaft portion, said support ring having an axially extending portion in contact with said shaft portion and a radially extending portion;
   a connection component surrounding said shaft portion, said connection component comprising a through bore receiving said shaft portion of said ball pivot;
   an annular sealing element arranged between said support ring and said connection component, said sealing element comprising an elastically and/or plastically deformable profiled body having an effective cross section in a state not affected by compressive or tensile forces, said effective cross section having a continuously extending curved contour subject to deformation in an installed state, said profiled body having a first sealing portion and a second sealing portion in said installed state, said first sealing portion extending in a radial direction of said ball pivot in said installed state such that said first sealing portion is axially arranged between and engages said connection component and said support ring, said second sealing portion extending in an axial direction of said ball pivot in said installed state such that said second sealing portion is radially arranged within said through bore between said shaft portion of said ball pivot and said connection component and engages said shaft portion of said ball pivot, said connection component being located at an axially spaced location from said support ring;

a sealing bellows having a first end and a second end, said first end of said sealing bellows engaging said ball and socket joint housing, said second end of said sealing bellows engaging said axially extending portion of said support ring and said radially extending portion of said support ring, said radially extending portion of said support ring extending between said second end of said sealing bellows and said sealing element.

18. A ball and socket joint in accordance with claim 17, wherein said elastically and/or plastically deformable profiled body has a profiled basic body and sealing segments extending radially in relation to said profiled basic body.

19. A ball and socket joint in accordance with claim 18, wherein said profiled body includes transition areas connecting said profiled basic body to said sealing segments.

20. A ball and socket joint in accordance with claim 17, wherein said engagement between said profiled body, said connection component and said shaft of said ball pivot comprises a connection established by vulcanization or bonding.

21. A ball and socket joint in accordance with claim 17, wherein said support ring has a radially extending flange having an area to be sealed of said support ring, said radially extending flange being in contact with said profiled body under pretension or compression.

22. A ball and socket joint in accordance with claim 17, wherein said profiled body has at least one stabilizing element.

23. A motor vehicles chassis ball and socket joint comprising:

a ball and socket joint housing having a joint opening;

a ball pivot comprising a ball portion arranged in said ball and socket joint housing and an integral shaft portion arranged outside of said ball and socket joint housing;

a support ring on said shaft portion;

a connection component surrounding said shaft portion, said connection component comprising a through bore receiving said shaft portion of said ball pivot;

a sealing bellows extending from said ball and socket joint housing to said support ring, wherein one end of said sealing bellow is in contact with said support ring; and an annular sealing element arranged between said support ring and said connection component, said sealing element comprising an elastically and/or plastically deformable profiled body having an effective cross section in a state not affected by compressive or tensile forces, said effective cross section having a continuously extending curved contour subject to deformation in an installed state, said profiled body having a first sealing portion and a second sealing portion in said installed state, said first sealing portion extending in a radial direction of said ball pivot in said installed state such that said first sealing portion is axially arranged on a side of said support ring opposite said sealing bellows between said support ring and said connection component and engages said connection component and said support ring, said second sealing portion extending in an axial direction of said ball pivot in said installed state such that said second sealing portion is radially arranged within said through bore between said shaft portion of said ball pivot and said connection component and engages said shaft portion of said ball pivot.

* * * * *